United States Patent [19]
Wulfing

[11] Patent Number: 5,640,298
[45] Date of Patent: Jun. 17, 1997

[54] RECORDING DISC CARTRIDGE HAVING CENTRALLY-LOCATED, INTEGRAL, RAISED WEAR SURFACE

[75] Inventor: James J. Wulfing, Stillwater, Minn.

[73] Assignee: Imation Corp., Oakdale, Minn.

[21] Appl. No.: 509,032

[22] Filed: Jul. 28, 1995

[51] Int. Cl.⁶ .................................................. G11B 23/03
[52] U.S. Cl. ........................................................ 360/133
[58] Field of Search ...................................... 360/133, 132

[56] References Cited

U.S. PATENT DOCUMENTS

| | | | |
|---|---|---|---|
| 4,544,977 | 10/1985 | Ozawa | 360/133 |
| 4,604,664 | 8/1986 | Barski | 360/133 |
| 4,743,994 | 5/1988 | Kato et al. . | |
| 4,768,123 | 8/1988 | Iizuka et al. . | |
| 4,855,857 | 8/1989 | Ono et al. . | |
| 4,879,621 | 11/1989 | Chamberlin et al. . | |
| 5,053,905 | 10/1991 | Kiji et al. . | |
| 5,103,363 | 4/1992 | Yamada et al. . | |
| 5,241,441 | 8/1993 | Yamada et al. . | |

FOREIGN PATENT DOCUMENTS

| | | |
|---|---|---|
| 0 498 608 A2 | 8/1992 | European Pat. Off. . |
| 2 108 309 | 5/1983 | United Kingdom . |
| 2 161 978 | 1/1986 | United Kingdom . |

*Primary Examiner*—A. J. Heinz
*Attorney, Agent, or Firm*—Eric D. Levinson

[57] ABSTRACT

A cartridge including a cover casing, a back casing, and a disc-shaped medium provided between the casings. The cover casing has a centrally-located, raised surface on its interior surface which is chemically and physically integral with the cover casing. When the cartridge is inserted into a drive for reading/writing the medium, a drive pin from the drive contacts the raised surface. The cover casing is comprised of high-impact polystyrene containing silicone.

2 Claims, 1 Drawing Sheet

RECORDING DISC CARTRIDGE HAVING CENTRALLY-LOCATED, INTEGRAL, RAISED WEAR SURFACE

FIELD OF THE INVENTION

The present invention relates generally to recording disc cartridges, and more specifically to a centrally-located, wear-resistant portion on an inner surface thereof.

BACKGROUND OF THE INVENTION

Floppy magnetic recording discs are flexible discs of polyester resin or the like having a magnetic layer on each side thereof on which information is recorded by a magnetic head. Floppy discs which have a diameter of 3½ inches (8.9 cm) or less are known as micro-floppy discs. Generally, the micro-floppy disc is accommodated in a hard casing to form a cartridge. The micro-floppy disc comprises a circular magnetic recording medium which is thin, has a small diameter, and has a hub fixed to the center of the recording medium.

A conventional micro-floppy magnetic recording disc cartridge according to the prior art is shown in FIG. 1. Cartridge 10 is comprised of a cover casing 12 and a back casing 20 which enclose a floppy magnetic recording disc 16 between them. Recording disc 16 has a metal hub 15 provided therein. Casings 12 and 20 each have a fabric liner 14 and 18, respectively, on their inner surface which approximates the shape of the disc 16. A rectangular opening 26 in cover 12 and a similar opening (not shown) in back casing 20 allows for a read/write head (not shown) to access disc 16 when the shutter (not shown) is moved to an "open" position. A centrally located circular hole 24 in back casing 20 allows for a drive mechanism (not shown) to engage hub 15 and cause disc 16 to rotate within cartridge 10.

The inner surface 34 of cover casing 12 (i.e., the surface facing disc 16) is shown in FIG. 2. A centrally located circular rib 36 is configured to maintain hub 15 therein, thereby minimizing vibration and rattle of the hub and disc 16 within cartridge 10.

An abrasion chip 38 is attached to inner surface 34 of cover casing 12 in the center of the area bounded by circular rib 36. When cartridge 10 is inserted into a drive for reading and/or writing on disc 16, a drive pin from the drive (not shown) is inserted into a centrally-located hole (not shown) within hub 15. Abrasion chip 38 prevents direct contact of the drive pin with inner surface 34 of cover casing 12 when reading and writing data on disc 16 in order to prevent abrasion of the inner surface of the cover casing. Abrasion chip 38 may be any shape, including a circle, square, rectangle, parallelogram, trapezoid, triangle, or other polygons. Abrasion chip 38 is typically affixed to inner surface 34 of cover casing 12 by an adhesive.

SUMMARY OF THE INVENTION

The present invention relates to a cartridge for a recordable disc-shaped medium. The cartridge is comprised of a cover casing and a back casing. The cover casing includes a centrally-located, raised surface on the interior surface of the cover casing. The raised surface is molded-in to the cover casing, that is, it is chemically and physically integral with the cover casing. When the cartridge is inserted into a drive for reading and/or writing the medium, a drive pin from the drive contacts the raised surface on the interior surface of the cover casing.

The cartridge preferably comprises high-impact polystyrene including silicone, which material has good abrasion resistance, but may comprise other thermoplastic materials, such as acrylonitrile butadiene styrene. The raised surface is preferably substantially planar and substantially parallel to the plane of the medium. The raised surface area may be in the shape of a circle, having a diameter of 6–10 mm, or a polygon, e.g., triangle or square, and preferably has an area within the range of from 20 to 150 $mm^2$, and more preferably 30 to 80 $mm^2$. The raised surface should be about 0.6 mm from a plane defined by connecting the midpoints between the cover and back casings.

The present invention also includes a method of making the cartridge casing described above. The method includes the steps of molding the cartridge cover case and simultaneously molding the raised surface, so that the raised surface is chemically and physically integral with the casing.

DETAILED DESCRIPTION

Figure 1:
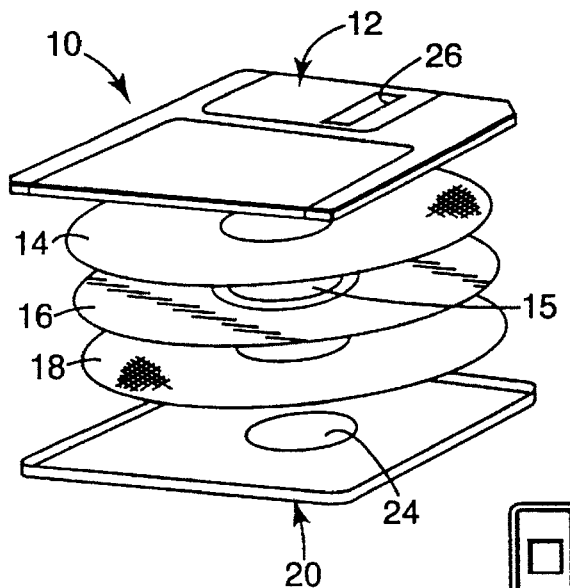
FIG. 1 shows an exploded view of a micro-floppy magnetic recording disc cartridge according to the prior art.
Figure 2:
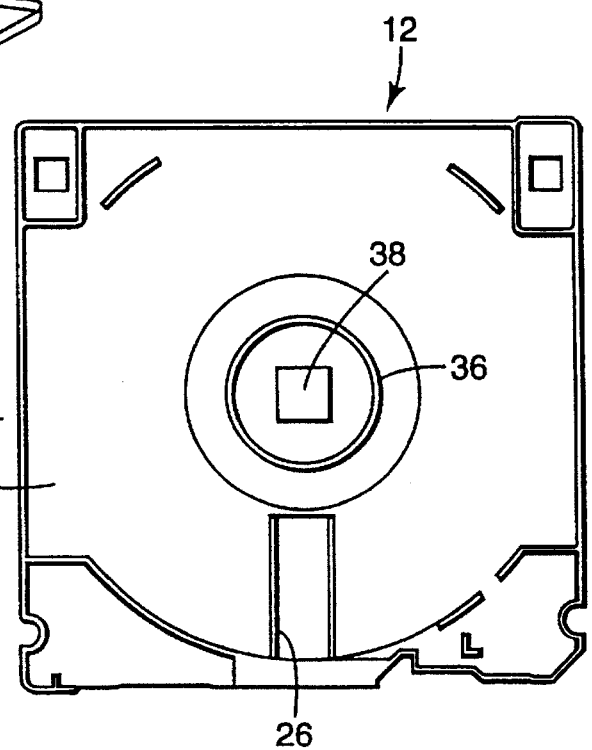
FIG. 2 shows a planar view of the inner surface of the cover casing shown in FIG. 1.
Figure 3:
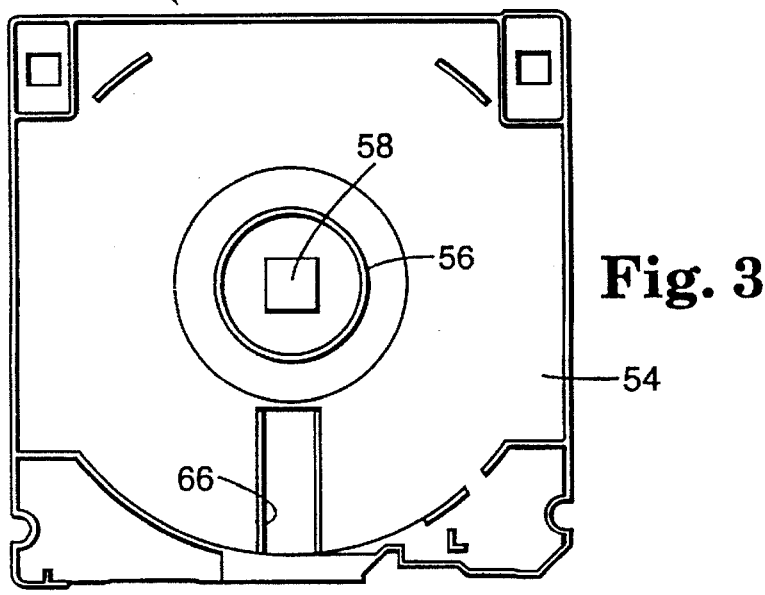
FIG. 3 shows a planar view of the inner surface of the cover casing of a recording disc cartridge according to one embodiment of the present invention.

An outer cover casing 52 according to the present invention is shown in FIG. 3. Cover casing 52 resembles cover casing 12 in every aspect except one. Like cover casing 12, cover casing 52 has a rectangular opening 66 and a centrally located circular rib 56. However, cover casing 52 differs from cover casing 12 in that instead of having an abrasion chip 38 adhered to the inner surface of the cover casing, cover casing 52 has a raised wear surface 58 which is chemically and physically integral with the casing.

Raised wear surface 58 may be any shape, such as a circle or a polygon, e.g., a square. If the raised surface is a circle, it preferably has a diameter of between 3 and 21 mm, more preferably between 5 and 14 mm, more preferably still, from 6 to 10 mm, and most preferably about 8 mm. The raised surface preferably has a height such that the distance from the raised surface to the midpoint between the two assembled casings is about 0.61 mm±0.05 mm, or about 0.1 mm higher than the rest of the casing within circular rib 56. The raised surface may be smooth or textured. The raised surface may be provided within another geometric shape, such as a square, which is depressed with respect to the rest of the area within the circular rib. If the square area were 0.15 mm lower than the surrounding area, then the raised surface would have to be 0.25 mm higher than the square region in order to be 0.1 mm higher than the remainder of the area within the circular rib.

Casing 52 is preferably made of high-impact polystyrene containing silicone, such as Styron 8100 MFD available from Dow Chemical Company in Midland, Mich. In a less preferred embodiment, the casing may be made of acrylonitrile butadiene styrene.

The present invention offers several advantages over the use of prior art abrasion-resistant chips. For example, abrasion-resistant chips require the creation of machines for making the chip material and machines for installing the chips. Either of these machines may break down. Furthermore, an error during installation of the chip may cause the entire cartridge casing assembly line to be shut down, and may result in the creation of casings which must be scrapped. The abrasion-resistant chip also requires the use of some adhesive to secure the chip to the casing. Depending on what type of adhesive is used, it may be necessary to provide a release liner which is discarded when the adhesive is exposed. Furthermore, if an insufficient amount of adhesive is applied, the abrasion-resistant chip may delaminate from the cover casing, and may move to a position where it does not protect the cartridge from the drive pin, and where it might interfere with the performance of the media.

By providing a raised area on the casing that is molded in the casing, all of the above disadvantages are eliminated: there is no chip-making machine, there is no chip installing machine, there is no risk of having to stop a manufacturing line due to a misplaced chip, there is no creation of casings which must be scrapped, there is no adhesive, there is no wasted adhesive liner, and there is no risk that the raised surface will delaminate from the cover casing. The invention also has the added advantage that the raised surface is made from the same material as the rest of the cartridge casing. This may be beneficial if a cartridge casing is to be recycled.

Although the present invention has been described with reference to a cartridge housing a magnetic floppy disk, those skilled in the art will appreciate that the invention extends to housings for other disc-shaped media, such as recordable optical discs.

The present invention will now be further illustrated by the following non-limiting examples. (All measurements are approximate.)

EXAMPLE 1

Six micro-floppy magnetic recording diskette cartridges were loaded into three different drives. Three of the diskettes, denoted as A, B, and C, were molded from the Dow Styron 8100 MFD material described above and had integral raised surfaces according to the present invention. The other three diskettes, denoted as D, E, and F, were also molded from Dow Styron 8100 MFD, but had an ultrahigh-density polyethylene anti-abrasion chip. The six diskettes were loaded into and ejected out of the three drives until the first ejection failure occurred. The number of such cycles leading up to the first such failure is shown in the Table.

TABLE

| No. of insertion/ejection cycles before failure | | | |
|---|---|---|---|
| Diskette | Drive #1 | Drive #2 | Drive #3 |
| A | 634 | 2,597 | 531 |
| B | 732 | 2,498 | 895 |
| C | 1,781 | 3,773 | 2,367 |
| D | 1,407 | 746 | 782 |
| E | 2,937 | 788 | 1,503 |
| F | 33,995 | 7,180 | 4,127 |

The Table illustrates that the cartridges having the raised wear surface according to the present invention performed just as long before failure (and actually longer in some cases) than the cartridges having the anti-abrasion chip.

EXAMPLE 2

Three groups of diskettes were run for 10 million revolutions of the recording medium. Group 1 was made up of diskette cartridges made of Dow Styron 8100 MFD according to the present invention. Group 2 was made up of diskette cartridges made of acrylonitrile butadiene styrene according to a less preferred embodiment of the present invention. Group 3 was made up of diskette cartridges made of Dow Styron 8100 MFD but having an ultra-high-density polyethylene anti-abrasion chip.

The wear point of each cartridge was photographed at a magnification of 11x. Groups 1 and 2 each showed a circular wear pattern with local plastic debris which was contained within the area bounded by circular rib 56. Group 3 showed a single contact point with no plastic debris. Although the use of the molded-in raised area did generate increased plastic debris, it was confined within the area bounded by the circular rib, and thus did not present a media contamination problem.

I claim:

1. A cartridge comprising a cover casing, a back casing, and a disc-shaped planar medium provided therebetween, wherein the cover casing is made from a material comprising high-impact polystyrene and silicone and the cover casing includes a centrally-located, raised surface on a side of the cover casing facing the medium which is chemically and physically integral with the cover casing, wherein the raised surface is substantially planar and substantially parallel to the plane of the medium, whereby when the cartridge is inserted into a drive for reading/writing the medium, a drive pin from the drive contacts the raised surface.

2. A method of making a cartridge casing for housing a disc-shaped recording medium, comprising:

molding a cartridge cover casing, comprising high-impact polystyrene and silicone, the cover casing configured to house, along with a back casing, a planar disc-shaped recording medium; and simultaneously molding a raised surface in a centrally located portion of the cover casing, wherein the raised surface is provided on a side of the cover casing configured to face the medium, wherein the raised surface has an area ranging from about 30 to 80 mm$^2$, wherein the raised surface is chemically and physically integral with the casing, and wherein the raised surface is substantially planar and substantially parallel to the plane of the medium.

* * * * *